United States Patent
Pezzati

(10) Patent No.: US 10,828,993 B2
(45) Date of Patent: Nov. 10, 2020

(54) ELECTRIC POWER SYSTEM OF AN ELECTRIC DRIVE VEHICLE AND CORRESPONDING CONTROL METHOD

(71) Applicant: FERRARI S.p.A., Modena (IT)

(72) Inventor: Andrea Pezzati, Scandicci (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 16/436,529

(22) Filed: Jun. 10, 2019

(65) Prior Publication Data

US 2019/0375303 A1    Dec. 12, 2019

(30) Foreign Application Priority Data

Jun. 11, 2018   (IT) .................. 102018000006205

(51) Int. Cl.
*H02P 27/06* (2006.01)
*B60L 15/20* (2006.01)
*B60L 58/10* (2019.01)

(52) U.S. Cl.
CPC .......... *B60L 15/2045* (2013.01); *B60L 58/10* (2019.02); *H02P 27/06* (2013.01); *B60L 2210/40* (2013.01)

(58) Field of Classification Search
CPC ...... B60L 58/26; B60L 50/51; Y02T 10/7005; Y02T 10/7066
See application file for complete search history.

(56) References Cited

U.S. PATENT DOCUMENTS

| 7,154,237 | B2 * | 12/2006 | Welchko | ............... B60L 15/025 |
| | | | | 318/400.27 |
| 7,956,563 | B2 * | 6/2011 | Perisic | .................... H02P 25/22 |
| | | | | 318/440 |
| 8,002,056 | B2 * | 8/2011 | Chakrabarti | ............ B60L 58/12 |
| | | | | 180/65.22 |

(Continued)

FOREIGN PATENT DOCUMENTS

| EP | 2034596 A1 | 11/2009 |
| EP | 2434609 A2 | 1/2011 |

(Continued)

OTHER PUBLICATIONS

Search Report issued in Italian Application No. 201800006205, completed Feb. 19, 2019; 9 pages.

(Continued)

*Primary Examiner* — Rina I Duda
(74) *Attorney, Agent, or Firm* — Cantor Colburn LLP

(57) ABSTRACT

An electric power system of a vehicle with an electric drive obtained by means of an electric machine; the electric power system has: a storage system provided with a first pack of chemical batteries and with a second pack of chemical batteries; a first electronic DC-AC power converter, which has a direct current side connected to the first pack of chemical batteries and an alternating current side connected to the electric machine; and a second electronic DC-AC power converter, which has a direct current side connected to the second pack of chemical batteries and an alternating current side connected to the electric machine, in addition and in parallel to the first electronic power converter, so that the electric machine can be controlled by the first electronic power converter or by the second electronic power converter.

12 Claims, 6 Drawing Sheets

(56) References Cited

U.S. PATENT DOCUMENTS

| | | | |
|---|---|---|---|
| 8,026,691 B2 * | 9/2011 | Nagashima | B60L 58/33 |
| | | | 318/801 |
| 8,102,142 B2 * | 1/2012 | Smith | B60L 58/20 |
| | | | 318/801 |
| 2009/0033252 A1 | 2/2009 | Smith et al. | |
| 2009/0033274 A1 | 2/2009 | Perisic et al. | |
| 2011/0082611 A1 * | 4/2011 | Shiba | B60L 15/007 |
| | | | 701/22 |
| 2011/0101915 A1 | 5/2011 | Mitsutani | |
| 2015/0360573 A1 * | 12/2015 | Cimatti | B60W 10/26 |
| | | | 307/10.1 |
| 2016/0280208 A1 * | 9/2016 | Yamauchi | B60K 6/48 |

FOREIGN PATENT DOCUMENTS

| | | |
|---|---|---|
| EP | 2987674 A1 | 2/2016 |
| WO | 2013102673 A1 | 7/2013 |

OTHER PUBLICATIONS

Search Report issued in European Application No. 19179443.7-1205, dated Nov. 7, 2019, completed Oct. 31, 2019; 10 pages.

* cited by examiner

ELECTRIC POWER SYSTEM OF AN ELECTRIC DRIVE VEHICLE AND CORRESPONDING CONTROL METHOD

CROSS-REFERENCE TO RELATED APPLICATIONS

This patent application claims priority from Italian Patent Application No. 102018000006205 filed on Jun. 11, 2018, the entire disclosure of which is incorporated herein by reference.

TECHNICAL FIELD

The invention relates to an electric power system of an electric drive vehicle and to a corresponding control method.

The invention finds advantageous application in a road vehicle with hybrid drive, to which explicit reference will be made in the description below without because of this loosing in generality.

PRIOR ART

A hybrid vehicle comprises an internal combustion heat engine, which transmits a torque to the drive wheels by means of a drivetrain provided with a transmission, and at least one electric machine, which is electrically connected to a power storage system and is mechanically connected to the drive wheels.

The electric power system of a hybrid vehicle comprises a storage system provided with a pack of chemical batteries and a two-way electronic DC-AC power converter, which, on the direct current side, is connected to the storage device and, on the alternating current side is connected to the electric machine and fulfils the function of controlling the electric machine.

The chemical batteries used in current road vehicles with hybrid drive can have a large specific storable electric energy (i.e. per unit of mass and/or volume) and a small specific deliverable electric power (i.e. per unit of mass and/or volume) and, hence, be suited to fulfil the needs of a long stretch of road covered at a moderate speed (and, especially, with limited acceleration/decelerations). Alternatively, the chemical batteries used in current road vehicles with hybrid drive can have a small specific storable electric energy (i.e. per unit of mass and/or volume) and a large specific deliverable electric power (i.e. per unit of mass and/or volume) and, hence, be suited to fulfil the needs of a short stretch of road covered at a significant speed (and, especially, with high acceleration/decelerations).

In order to try and obtain an acceptable compromise between the range needs (which require chemical batteries with a large specific electric energy) and the performance needs (which require chemical batteries with a large specific electric power), manufacturers have tried to produce compromise chemical batteries with intermediate features between the two extremes; however, these compromise chemical batteries turn out to be a "downward" compromise, namely, before a significant reduction of the specific electric energy, they do not feature an equally significant increase in the specific electric power and vice versa.

In order to try and obtain an acceptable compromise between the range needs (which require chemical batteries with a large specific electric energy) and the performance needs (which require chemical batteries with a large specific electric power), manufacturers have also suggested to insert, in the storage system, both chemical batteries with a large specific electric energy and chemical batteries with a large specific electric power. However, the overall results (in terms of range and performances) and, in particular, the operating life of the chemical batteries turn out to be hardly satisfactory, as the "final result" is in some way smaller than the sum of the single parts.

Italian patent application BO2012A000315 discloses an electric power system of a vehicle with an electric drive obtained by means of at least one first electric machine. The electric power system has: a storage system comprising at least two packs of chemical batteries, which are electrically separate from one another; an electronic DC-AC power converter, which exchanges electric energy with the storage system and controls the first electric machine; and a pair of electronic DC-DC power converters, each increasing the voltage and having a low-voltage side, which is electrically connected only to a corresponding pack of chemical batteries, and a high-voltage side, which is connected to the electronic DC-AC power converter in parallel to the high-voltage side of the other electronic DC-DC power converter. However, the electric power system described in patent application BO2012A000315 is relatively expensive, heavy and large-sized, since, in order to control one single electric machine, it requires the presence of three electronic power converters (two electronic DC-DC power converters and one electronic DC-AC power converter).

U.S. Pat. No. 8,102,142B2 describes an electric power system of an electric drive vehicle comprising: a storage system comprising a first pack of chemical batteries and a second pack of chemical batteries, which are electrically separate from one another; a first electronic DC-AC power converter, which has a direct current side connected to the first pack of chemical batteries and an alternating current side connected to the electric machine; and a second electronic DC-AC power converter, which has a direct current side connected to the second pack of chemical batteries and an alternating current side connected to the electric machine, in addition to the first electronic power converter, so that the electric machine can be powered by the first electronic power converter and/or by the second electronic power converter. In U.S. Pat. No. 8,102,142B2, the electric machine can be powered by the sole first pack of chemical batteries, by the sole second pack of chemical batteries or, simultaneously, by both packs of chemical batteries.

DESCRIPTION OF THE INVENTION

The object of the invention is to provide an electric power system of an electric drive vehicle and a relative control method, said electric power system not being affected by the drawbacks described above and, at the same time, being easy and economic to be manufactured.

According to the invention, there are provided an electric power system of an electric drive vehicle and a relative control method as claimed in the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
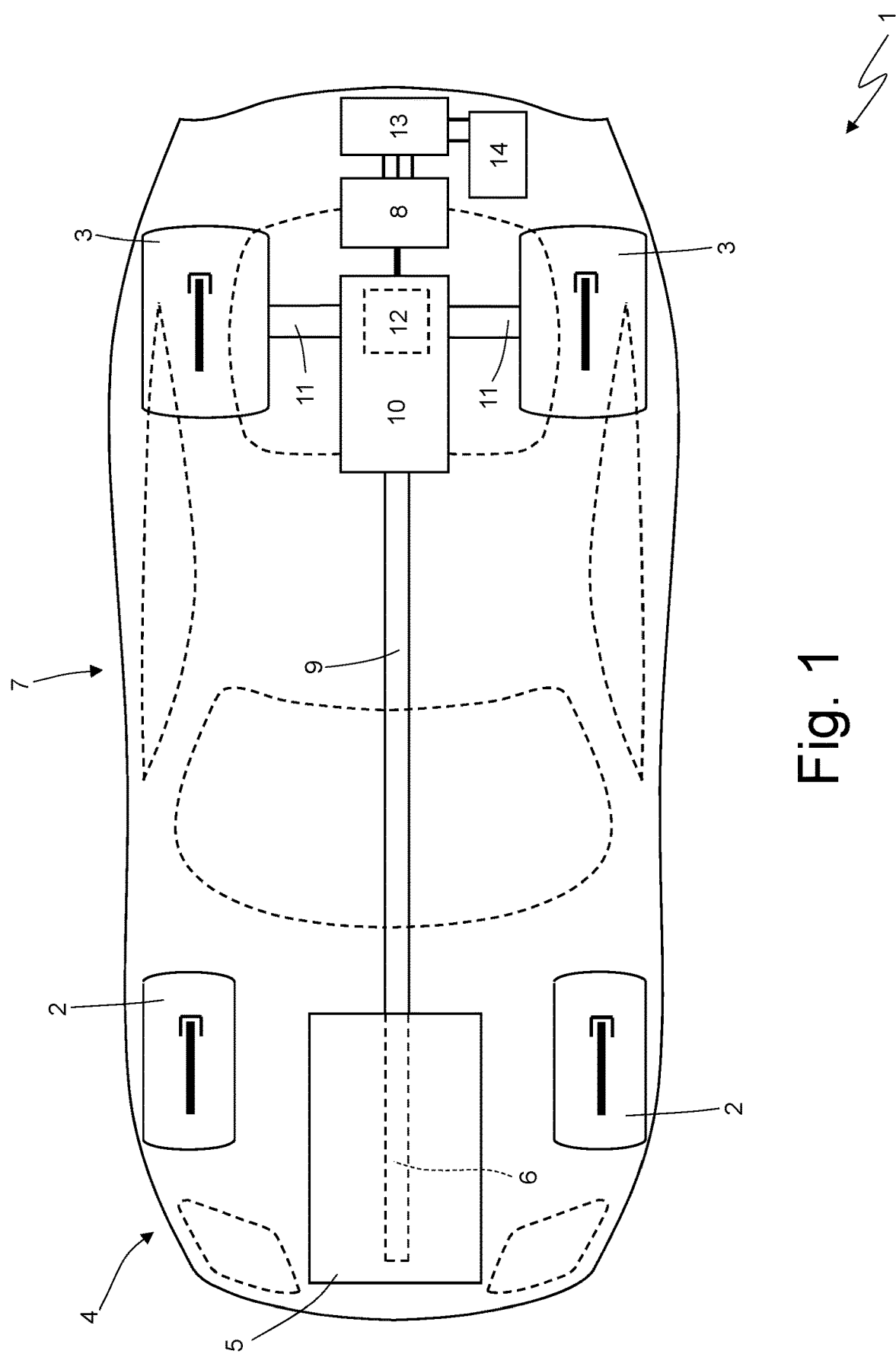
FIG. 1 is a schematic plan view of a road vehicle with hybrid drive.

In FIG. 1, number 1 indicates, as a whole, a road vehicle with hybrid drive, which is provided with two front wheels 2 and two rear drive wheels 3, which receive the torque from a hybrid powertrain system 4.

The hybrid powertrain system 4 comprises an internal combustion heat engine 5, which is arranged in a front position and is provided with a crankshaft 6, a drivetrain 7, which transmits the torque generated by the internal combustion engine 5 to the rear drive wheels 3, and an electric machine 8, which is mechanically connected to the drivetrain 7 and is reversible (i.e. it can work both as an electric motor, absorbing electric energy and generating a mechanical torque, and as an electric generator, absorbing mechanical energy and generating electric energy).

The drivetrain 7 comprises a drive shaft 9, which, on one side, is angularly integral to the crankshaft 6 and, on the other side, is mechanically connected to a transmission 10, which is arranged in a rear position and transmits the motion to the rear drive wheels 3 by means of two axle shafts 11, which receive the motion from a differential 12.

The electric machine 8 is mechanically connected to the transmission 10 and is controlled by a control device 13, which is connected to an electric energy storage system 14 provided with chemical batteries.

Figure 2:
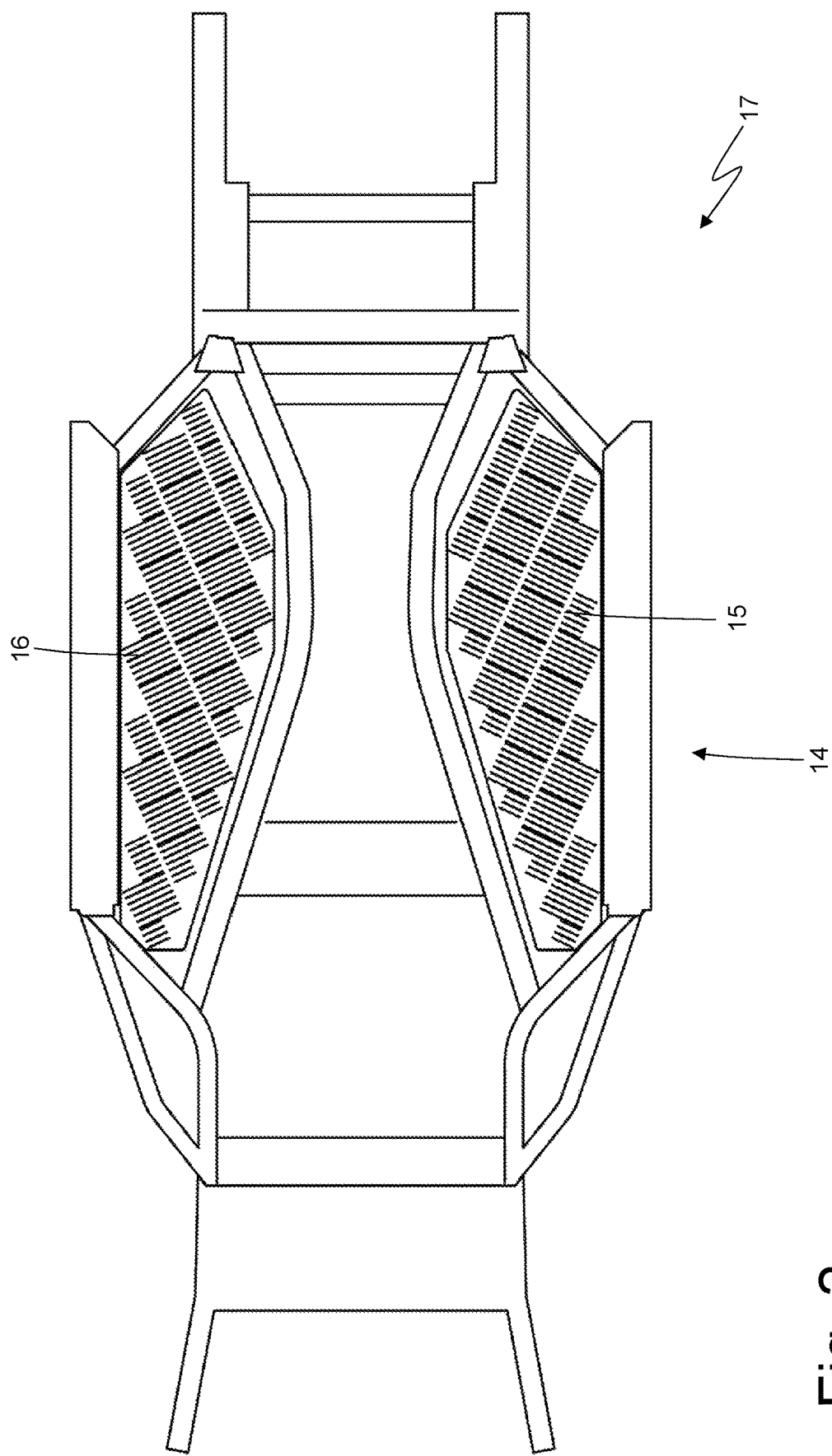
FIG. 2 is a schematic, plan view of a frame of the road vehicle of FIG. 1, highlighting an electric energy storage system.

According to FIG. 2, the storage system 14 comprises two distinct packs 15 and 16 of chemical batteries, each consisting of a plurality of chemical batteries connected to one another in series and/or in parallel; each chemical battery comprises respective electrochemical cells, which are suited to turn the chemical energy stored into electric energy and vice versa. The chemical batteries of the two packs 15 and 16 of chemical batteries have different electric energy storing and delivering features: in particular, the chemical batteries of the pack 15 of chemical batteries have a greater specific storable electric energy (i.e. per unit of mass and/or volume) and a smaller specific deliverable electric power (i.e. per unit of mass and/or volume) compared to the chemical batteries of the pack 16 of chemical batteries.

As a consequence, the chemical batteries of the pack 15 of batteries are suited to fulfil the needs of a long stretch of road covered at a moderate speed (and, especially, with limited accelerations/decelerations), as they have the advantage of being capable of providing a large quantity of specific electric energy (i.e. per unit of mass and/or volume), but suffer from the drawback of not being capable of delivering a very large specific electric power (i.e. per unit of mass and/or volume) and, therefore, allow the road vehicle 1 to cover significant distances in electric mode (high range), but do not allow the road vehicle 1 to reach, in electric mode, high dynamic performances. On the contrary, the chemical batteries of the pack 16 of batteries are suited to fulfil the needs of a short stretch of road covered at a significant speed (and, especially, with high accelerations/decelerations), as they have the advantage of being capable of delivering a very large specific electric power (i.e. per unit of mass and/or volume), but, on the other hand, are not capable of providing a very large quantity of specific electric energy (i.e. per unit of mass and/or volume) and, therefore, allow the road vehicle 1 to reach, in electric mode, high dynamic performances, but do not allow the road vehicle 1 to cover significant distances in electric mode. The proportion between the two packs 15 and 16 of chemical batteries is selected during the designing phase, depending on the desired ratio between range and performances in electric mode.

Furthermore, the road vehicle 1 is provided with a frame 17 comprising a platform, which makes up a bottom wall of the passenger compartment; in the platform there are two housing accommodating the two packs 15 and 16 of chemical batteries, which rest on the platform itself.

Figure 3:
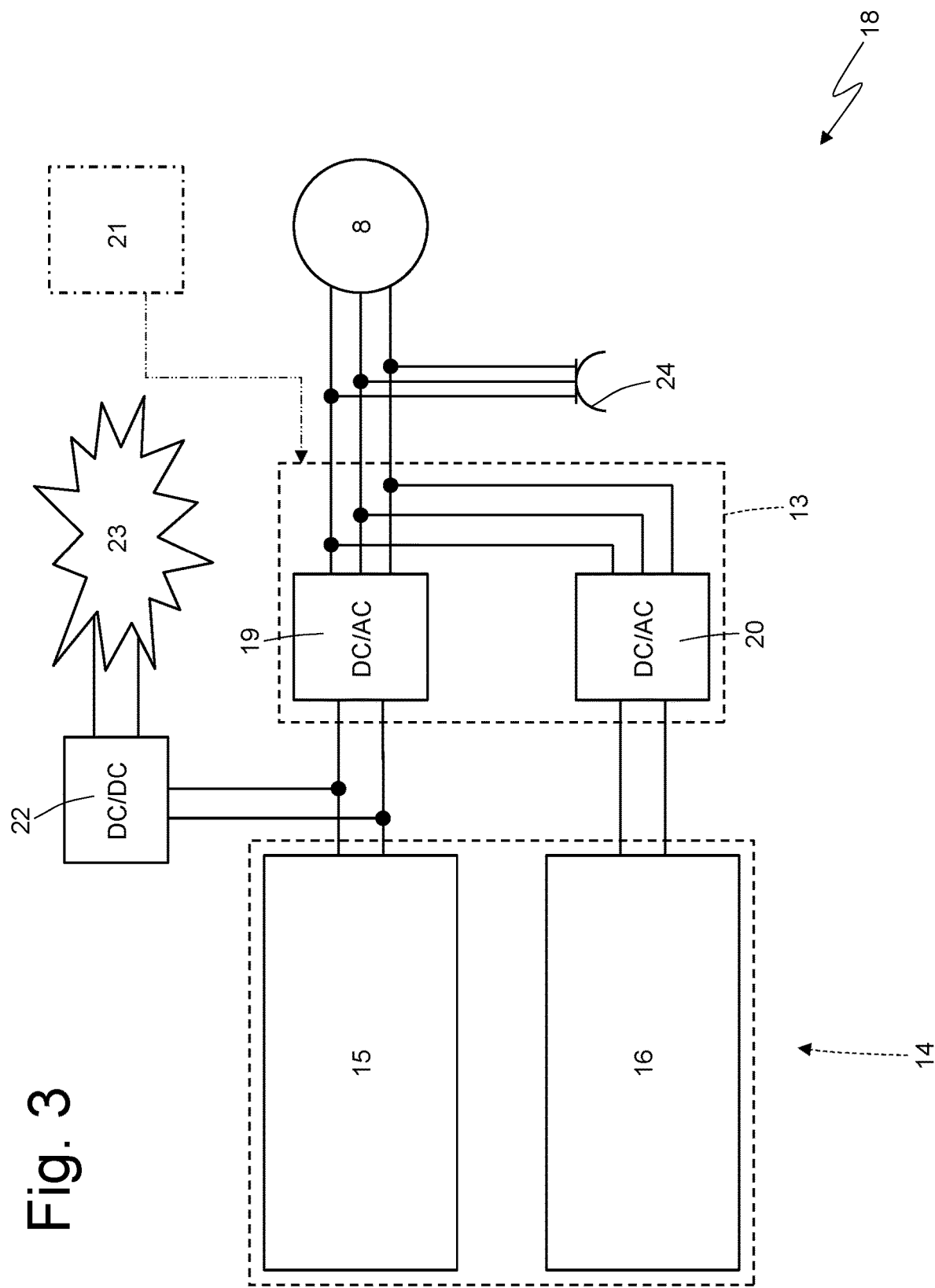
FIG. 3 is a schematic view of an electric power system of the road vehicle of FIG. 1, which is manufactured according to the invention.

According to FIG. 3, the road vehicle 1 is provided with an electric power system 18, which comprises the storage system 14 provided with the two packs 15 and 16 of chemical batteries and the control device 13, which, on one side, is connected to the storage system 14 and, on the opposite side, is connected to the electric machine 8 (namely, to the stator windings of the electric machine 8). The control device 13 comprises two electronic DC-AC power converters 19 and 20 (i.e. "inverters"), which both control (alternatively) the same electric machine 8; namely, each electronic power converter 19 or 20 has a direct current side, which is connected only to a corresponding pack 15 or 16 of chemical batteries (and, hence, is completely isolated form the other electronic power converter 20 or 19 and from the other pack 16 or 15 of chemical batteries), and comprises a three-phase alternating current side, which is connected to same electric machine 8 as the three-phase alternating current side of the other electronic power converter 20 or 19 (namely, the two electronic power converters 19 and 20 are connected in parallel to the terminals of the electric machine 8).

A control unit 21 is provided, which controls the operation of the control device 13 in order to pursue a rotation speed objective (positive for the forward gear and negative for the reverse gear) of the electric machine 8 and a torque objective (positive in case of operation as motor, negative in case of operation as generator) delivered or absorbed by the electric machine 8.

In use, the electric machine 8 is (always) controlled by one single electronic power converter 19 or 20 at a time, namely one single electronic power converter 19 or 20 at a time applies a three-phase alternating voltage to the terminals of the electric machine 8 (and, therefore, supplies/absorbs a three-phase alternating current flowing through the terminals of the electric machine 8). In particular, the control unit 21 translates the "mechanical" objectives (rotation speed and delivered/absorbed torque of the electric machine 8) into "electric" objectives (among them, an electric power to be supplied/absorbed to/by the electric machine 8) and, based on the "electric" objectives, establishes which one of the two electronic power converters 19 and 20 has to control the electric machine 8 applying an alternating voltage to the terminals of the electric machine 8 (namely, which one of the two electronic power converters 19 and 20 has to power the electric machine 8, which works as a motor, or has to receive electric energy from the electric machine 8, which works as generator). In other words, the control unit 21 cyclically establishes which one of the two electronic power converters 19 and 20 (namely, which one of the two packs 15 and 16 of chemical batteries) has to control the electric machine 8 and, if necessary, reverses (switches) the electronic power converter 19 or 20 (namely, the pack 15 or 16 of chemical batteries) controlling the electric machine 8.

Generally speaking, the selection of which one of the two electronic power converters 19 and 20 (namely, which one of the two packs 15 and 16 of chemical batteries) has to control the electric machine 8 is carried out based on the electric power to be supplied/absorbed to/by the electric machine 8: when the electric power to be supplied/absorbed to/by the electric machine 8 exceeds a threshold value, the electric machine 8 is controlled by the electronic power converter 20 (namely, by the pack 16 of chemical batteries), whereas, when the electric power to be supplied/absorbed to/by the electric machine 8 is below the threshold value, the electric machine 8 is controlled by the electronic power converter 19, namely by the pack 15 of chemical batteries).

Obviously, a hysteresis is applied to the threshold value in order to avoid a too high reversing (switching) frequency when the electric power to be supplied/absorbed to/by the electric machine 8 straddles the threshold value. The threshold value can be differentiated between the case of electric power supplied to the electric machine 8 (working as a motor) and the case of electric power absorbed by the electric machine 8 (working as generator). Furthermore, the threshold value can be variable depending on the actual temperature of the electronic power converters 19 and 20 (an electronic power converter 20 close to overheating is used less), depending on the actual temperature of the packs 15 and 16 of chemical batteries (a pack 15 or 16 of chemical batteries close to overheating is used less) and/or depending on the actual state of charge of the packs 15 and 16 of chemical batteries (a more exhausted pack 15 or 16 of chemical batteries is used less).

The reversing (switching) of the electronic power converter 19 or 20 (namely, of the pack 15 or 16 of chemical batteries) controlling the electric machine 8 is exclusively carried out by acting upon the electronics of the electronic power converters 19 and 20 (namely, by turning off the currently operating electronic power converter 19 or 20 and by turning on the other electronic power converter 20 or 19); as a consequence, the reversing (switching) of the electronic power converter 19 or 20 (namely, of the pack 15 and 16 of chemical batteries) controlling the electric machine 8 can take place in a very small amount of time (even below a millisecond) and, hence, can be carried out different (many) timer per second.

Obviously, the control unit 21 also takes into account the actual state of charge of two packs 15 and 16 of chemical batteries when it has to establish which electronic power converter 19 or 20 (namely, which pack 15 or 16 of chemical batteries) to use to control the electric machine 8; obviously, the control unit 21 will use less frequently (or will not use at all) a pack 15 or 16 of chemical batteries when the pack 15 or 16 of chemical batteries has a state of charge which is significantly lower than the one of the other pack 16 or 15 of chemical batteries.

When the electric machine 8 does not necessarily need to be controlled (because the electric machine 8 is off or because the road vehicle 1 is travelling under "cut-off" conditions), the control unit 21 could control the two electronic power converters 19 and 20 so as to transfer electric energy between the two packs 15 and 16 of chemical batteries, namely so as to transfer electric energy from the more charged pack 15 or 16 of chemical batteries to the other, more exhausted pack 16 or 15 of chemical batteries (the transfer of electric energy almost always takes place from the pack 15 of chemical batteries to the pack 16 of chemical batteries).

It should be pointed out that the two electronic power converters 19 and 20 could be integrated in one single unit, which means that they could both be placed inside a single container and, hence, could also share auxiliary components. Furthermore, it should be pointed out that the electronic power converter 19 must be optimized depending on the features of the pack 15 of chemical batteries (i.e. large quantity of energy and small power), whereas the electronic power converter 20 must be optimized depending on the features of the pack 16 of chemical batteries (i.e. small quantity of energy and great power).

The electric power system 18 comprises an electronic DC-DC power converter 22 which powers a low-voltage section 23 (typically having a nominal voltage of 12 Volts or 48 Volts), to which all the auxiliary services of the road vehicle 1 are connected (for example, an electric starter motor for the heat engine 5, an electric motor operating a pump of a power steering system, an electric motor operating a circulation pump of a cooling system of the heat engine 5 and/or electric machines 8 and 9, a radio set, a lighting and signaling system . . . ). The electronic power converter 22 normally is a one-way electronic power converter (i.e. is capable of transferring electric energy only towards the low-voltage section 23 and not vice versa). Generally speaking (though not necessarily), the low-voltage section 23 has no electric energy storage systems provided with chemical batteries (i.e. does not have any chemical battery) and exclusively receives electric energy through the sole electronic power converter 22.

Furthermore, the electric power system 18 comprises an electric outlet 24, which can be used to charge the storage system 14; when the electric outlet 24 is connected to an external source of electric energy, both electronic power converters 19 and 20 can be used in parallel to simultaneously charge both packs 15 and 16 of batteries or one single electronic power converter 19 or 20 at a time can be used to charge one single pack 15 or 16 of battery at a time. In the embodiment shown in the accompanying figures, the electric outlet 24 is a three-phase outlet, but, alternatively (or in combination), the electric outlet 24 could be a single-phase outlet.

Figure 4:
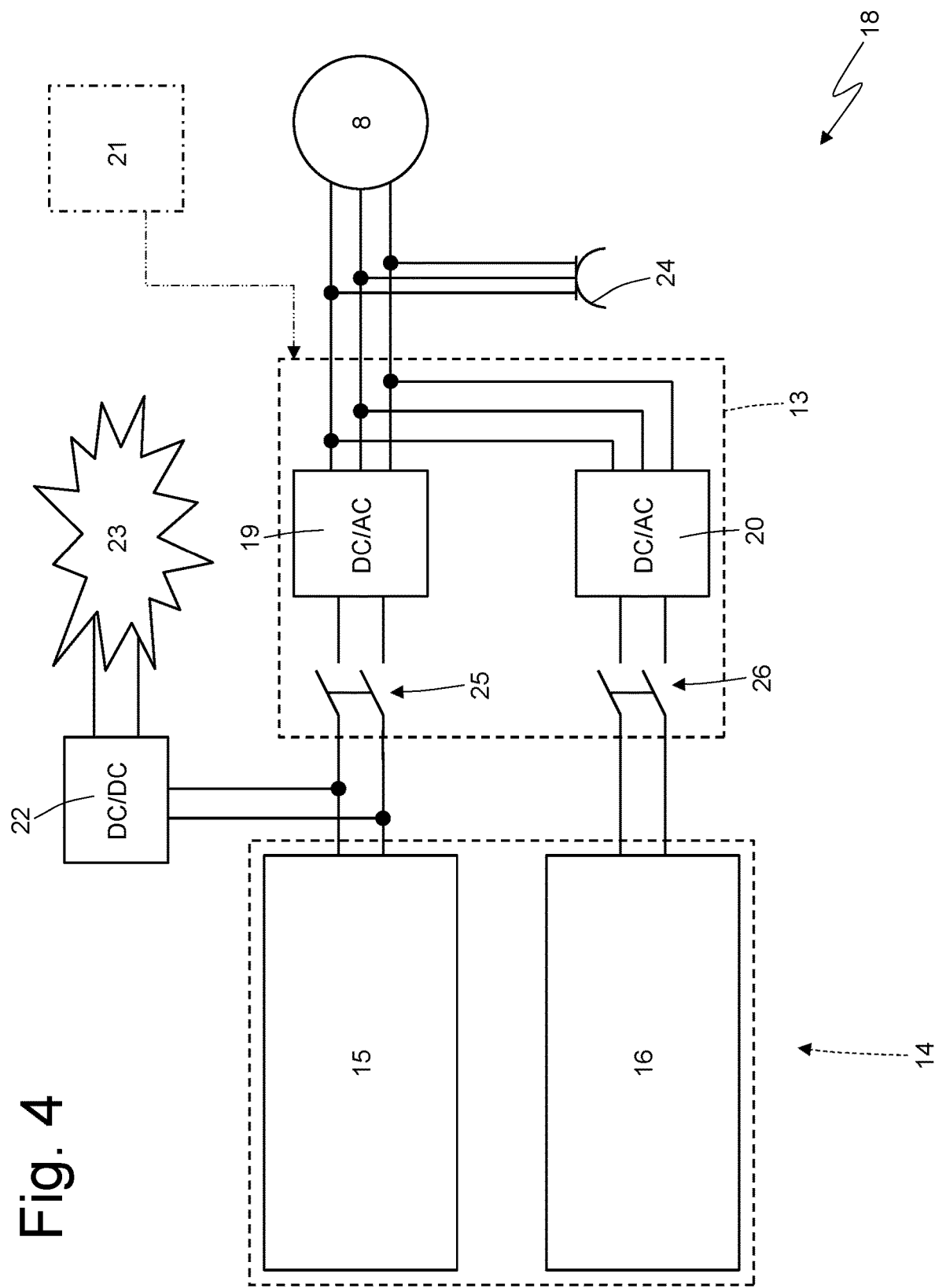
FIGS. 4, 5 and 6 are schematic views of variants of the electric power system of FIG. 3.
Figure 5:
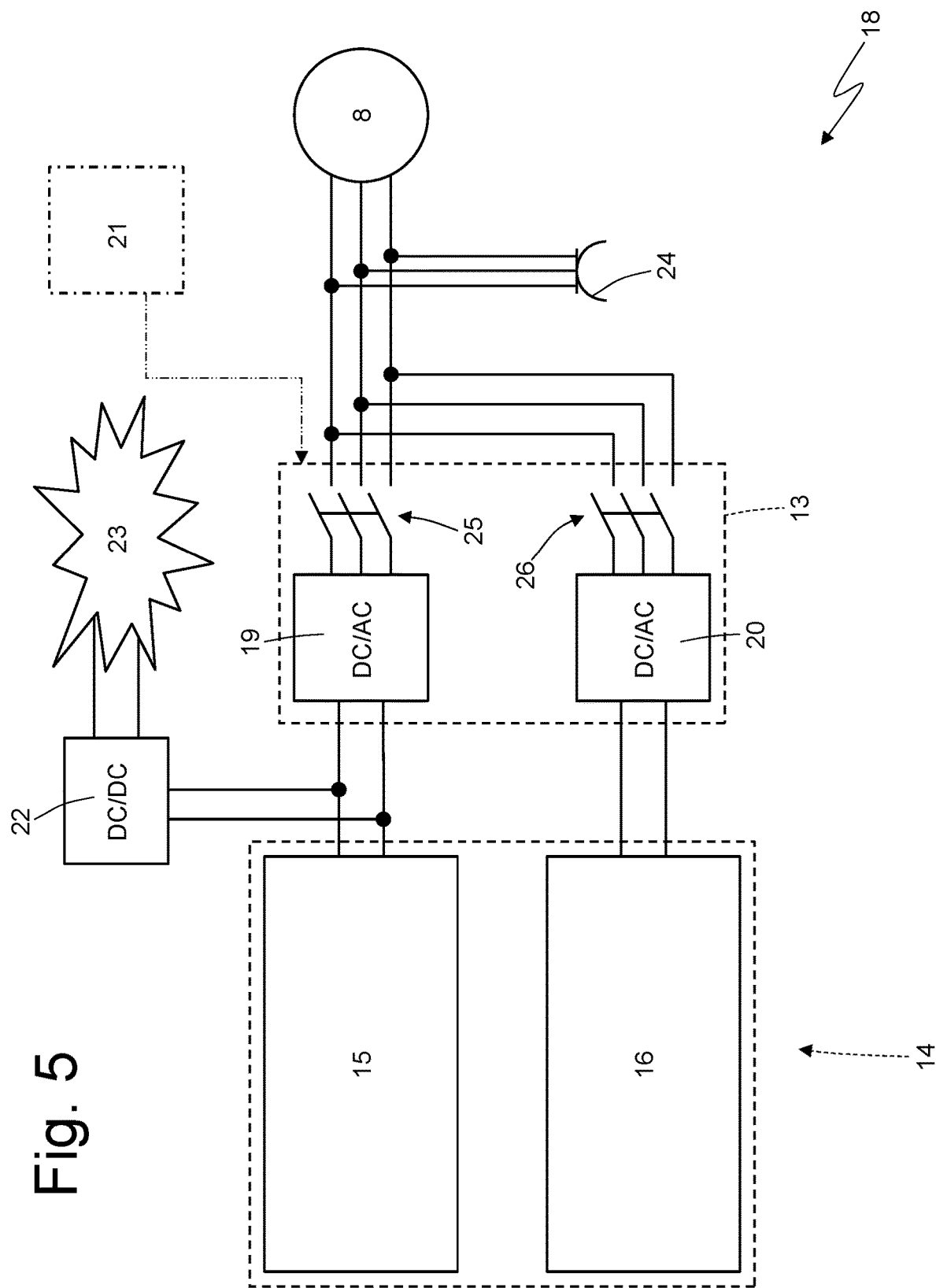
Figure 6:
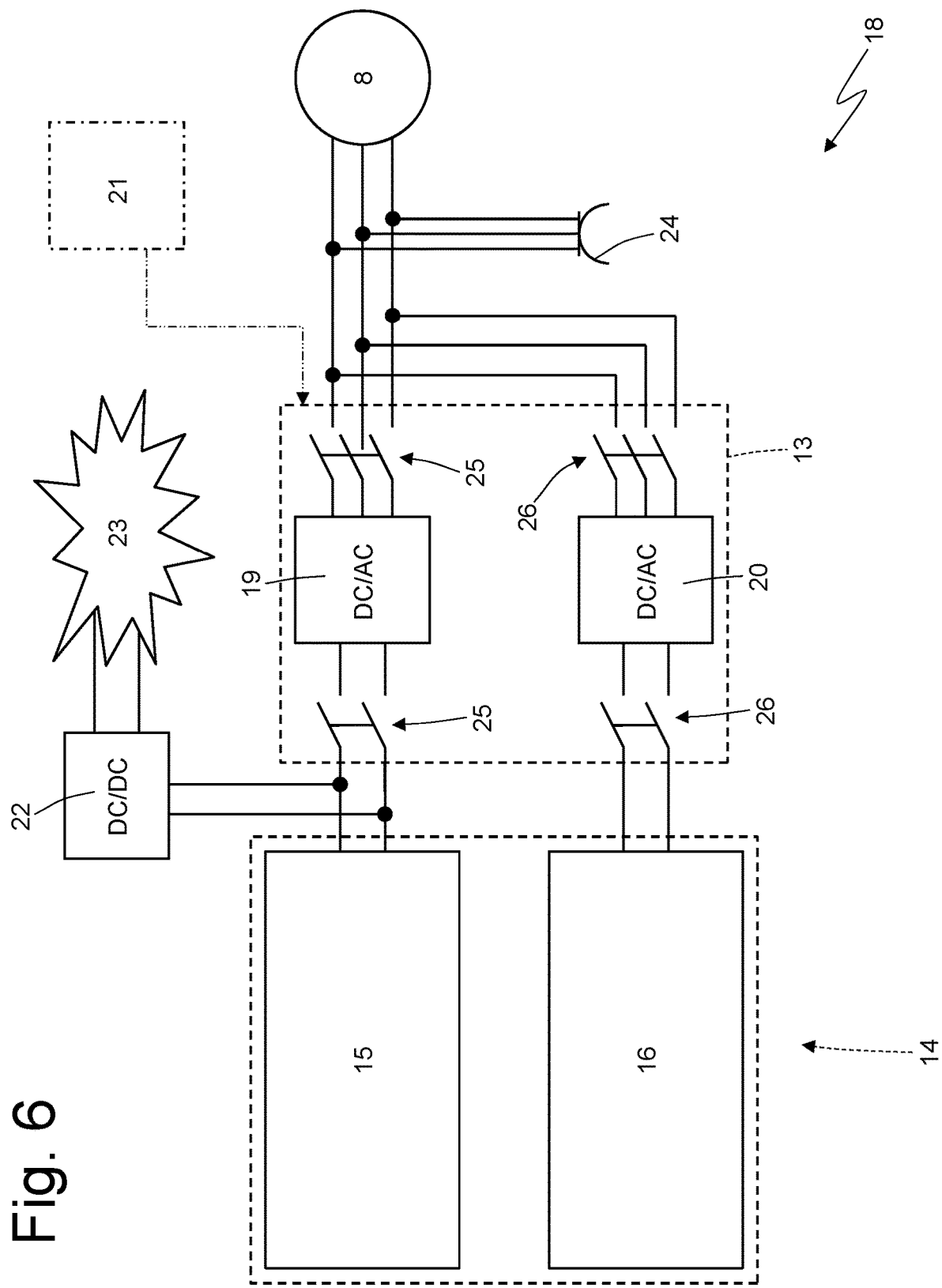

In the alternative embodiment shown in FIG. 4, two switches 25 and 26 are provided, which are interposed between the pack 15 of batteries and the electronic power converter 19 and between the pack 16 of batteries and the electronic power converter 20, respectively; obviously, in this case, the switches 25 and 26 are two-phase switches and are designed to operate with a direct current. In the variant shown in FIG. 5, the two switches 25 and 26 are moved to the alternating current side and are interposed between the electronic power converters 19 and 20 and the electric machine 8, respectively; obviously, in this case, the switches 25 and 26 are three-phase switches and are designed to operate with an alternating current. In the further variant shown in FIG. 6, there are two switches 25 and 26 both on the direct current side and on the alternating current side (namely, "combining" the embodiment shown in FIG. 4 with the embodiment shown in FIG. 5).

The function of the switches 25 and 26 is not that of carrying out the reversing (switching) of the electronic power converter 19 or 20 (namely, of the pack 15 or 16 of chemical batteries) controlling the electric machine 8 (this operation is exclusively carried out by acting upon the electronics of the electronic power converters 19 and 20), but that of isolating the electronic power converter 19 or 20 (namely, the pack 15 or 16 of chemical batteries) which is not being used, as additional safety measure (which protects the electric system 18 in case of errors in the control of the electronic power converters 19 and 20).

According to a different embodiment which is not shown herein (though is perfectly equivalent), the road vehicle 1 comprises two distinct electric machines 8: in this case, two distinct and independent electronic power converters 19 are provided, which connect the pack 15 of chemical batteries to the two electric machines 8, and two distinct and independent electronic power converters 20 are provided, which connect the pack 16 of chemical batteries to the two electric machines 8 (namely, there are two distinct and independent control devices 13, each connecting the storage system 14 to a corresponding electric machine 8).

According to a different embodiment which is not shown herein (though is perfectly equivalent), there is a larger number of packs of chemical batteries, each electrically connected to its own electronic DC-AC power converter, which has a direct current side, which is only connected to its own pack of chemical batteries, and an alternating current side, which is connected to the electric machine 8.

The embodiments described herein can be combined with one another, without for this reason going beyond the scope of protection of the invention.

The electric power system 18 described above has numerous advantages.

First of all, in the electric power system 18 described above, the two packs 15 and 16 of chemical batteries are handled in a completely independent manner, since the direct current sides of the electronic power converters 19 and 20 are totally isolated (separated) from the one another. Hence, the voltage at the terminals of the two packs 15 and 16 of chemical batteries can be different, both in terms of nominal value and in terms of variation during the use. This aspect is highly important for, as already mentioned above, the packs 15 and 16 of chemical batteries have very different features and, therefore, in order to properly operate, require different handling strategies.

Furthermore, the electric power system 18 described above is relatively simple and economic to be manufactured because, despite requiring, for one single electric machine 8, two different electronic power converters 19 and 20 dedicated to the electric machine 8, the two electronic power converters 19 and 20 always operate alternatively and, hence, can be sized for a non-continuous use; as a consequence, cost, weight and size of the electronic power converters 19 and 20 are significantly smaller than twice the cost, weight and size of one single conventional electronic power converter dedicated to the electric machine 8. In other words, doubling the number of electronic power converters dedicated to one single electric machine leads to a reduced increase (far from the double) in the cost, weight and size of the control electronics of the electric machine.

Finally, in the electronic power converter 18 described above, the management of the switching between the two electronic power converters 19 and 20 (namely, between the two packs 15 and 16 of chemical batteries) is particularly efficient and effective, without causing discontinuities in the torque generated/absorbed by the electric machine 8 and without excessively stressing both the electronic part (namely, the electronic power converters 19 and 20) and the chemical part (namely, the packs 15 and 16 of chemical batteries).

LIST OF THE REFERENCE NUMBERS OF THE FIGURES 1 vehicle
2 front wheels
3 rear wheels
4 powertrain system
5 engine
6 crankshaft
7 drivetrain
8 electric machine
9 drive shaft
10 mechanical transmission
11 axle shafts
12 differential
13 control device
14 storage system
15 pack of energy chemical batteries
16 pack of power chemical batteries
17 frame
18 electric power system
19 electronic power converter
20 electronic power converter
21 control unit
22 electronic power converter
23 low-voltage section
24 electric outlet
25 switch
26 switch

The invention claimed is:

1. An electric power system (18) of a vehicle (1) with an electric drive obtained by means of at least one electric machine (8); the electric power system (18) comprises:

a storage system (14) comprising a first pack (15) of chemical batteries and a second pack (16) of chemical batteries, which are electrically separated from one another;

a first electronic DC-AC power converter (19) having a direct current side connected to the first pack (15) of chemical batteries and not connected to the second pack (16) of chemical batteries, and an alternating current side connected to terminals of the electric machine (8);

a second electronic DC-AC power converter (20), which has a direct current side connected to the second pack (16) of chemical batteries and not connected to the first pack (15) of chemical batteries, and an alternating current side connected to the terminals of the electric machine (8), in addition and in parallel to the first electronic power converter (19), so that the electric machine (8) can be controlled selectively only by the first electronic DC-AC power converter (19) or only by the second electronic DC-AC power converter (20) during operation thereof; and a control unit (21), which establishes which one of the two electronic DC-AC power converters (19, 20) has to control the same electric machine (8) and, therefore, establishes when to switch the electronic DC-AC power converter (19, 20) controlling the same electric machine (8);

wherein the electric machine (8) is controlled by one single electronic DC-AC power converter (19, 20) at a time, namely, in any situation, one single electronic DC-AC power converter (19, 20) at a time applies an alternating voltage to terminals of the electric machine (8) and, therefore, supplies/absorbs an alternating current flowing through the terminals of the electric machine (8);

wherein the control unit (21) estimates an electric power to be supplied/absorbed to/by the electric machine (8) and establishes which one of the two electronic DC-AC power converters (19, 20) has to control alone the same electric machine (8) based on the electric power to be supplied/absorbed to/by the electric machine (8);

wherein, when the electric power to be supplied/absorbed to/by the electric machine (8) exceeds a threshold value, the electric machine (8) is controlled only by the second DC-AC electronic power converter (20); and wherein, when the electric power to be supplied/absorbed to/by the electric machine (8) is below said threshold value, the electric machine (8) is controlled only by the first electronic DC-AC power converter (19).

2. The electric power system (18) according to claim 1, wherein the control unit (21) applies a hysteresis to the threshold value, so as to avoid an excessive switching frequency when the electric power to be supplied/absorbed to/by the electric machine (8) straddles the threshold value.

3. The electric power system (18) according to claim 1, wherein the threshold value is differentiated between the case of electric power supplied to the electric machine (8) and the case of electric power absorbed by the electric machine (8).

4. The electric power system (18) according to claim 1, wherein the control unit (21) changes the threshold value based on an actual temperature of the electronic DC-AC power converters (19, 20) and/or based on an actual temperature of the packs (15, 16) of chemical batteries.

5. The electric power system (18) according to claim 1, wherein the control unit (21) changes the threshold value based on the state of charge of the packs (15, 16) of chemical batteries.

6. The electric power system (18) according to claim 1, wherein the control unit (21) receives a rotation speed objective for the electric machine (8) and a supplied/absorbed torque objective for the electric machine (8) and determines the electric power to supplied/absorbed to/by the electric machine (8) based on the rotation speed objective for the electric machine (8) and based on the supplied/absorbed torque objective for the electric machine (8).

7. The electric power system (18) according to claim 1, wherein the control unit (21) switches the electronic DC-AC power converter (19, 20) controlling the electric machine (8) by exclusively acting upon the electronics of the electronic DC-AC power converters (19, 20), namely by turning off the electronic DC-AC power converter (19, 20) currently working and by turning on the other electronic DC-AC power converter (20, 19).

8. The electric power system (18) according to claim 1, wherein, when the electric machine (8) does not necessarily have to be controlled, the control unit (21) can control the two electronic DC-AC power converters (19, 20) so as to transfer electric energy between the two packs (15, 16) of chemical batteries.

9. The electric power system (18) according to claim 1 and comprising:
a first switch (25), which is interposed between the first pack (15) of batteries and the first electronic DC AC power converter (19); and
a second switch (26), which is interposed between the second pack (16) of batteries and the second electronic DC-AC power converter (20).

10. The electric power system (18) according to claim 1 and comprising:
a third switch (25), which is interposed between the first electronic power converter (19) and the electric machine (8); and a fourth switch (26), which is interposed between the second electronic power converter (20) and the electric machine (8).

11. The electric power system (18) according to claim 1, wherein the first pack (15) of chemical batteries has a greater specific storable electric energy and a smaller specific deliverable electric power compared to the second pack (16) of chemical batteries.

12. A method to control an electric power system (18) of a vehicle (1) with an electric drive obtained by means of at least one electric machine (8); the electric power system (18) comprises:

a storage system (14) comprising a first pack (15) of chemical batteries and a second pack (16) of chemical batteries, which are electrically separated from one another;

a first electronic DC-AC power converter (19), which has a direct current side connected to the first pack (15) of chemical batteries for receiving electric energy only from the first pack (15) of chemical batteries and an alternating current side connected to terminals of the electric machine (8);

a second electronic DC-AC power converter (20), which has a direct current side connected DC-AC to the second pack (16) of chemical batteries for receiving electric energy only from the second pack (16) of chemical batteries and an alternating current side connected to the terminals of the electric machine (8), in addition and in parallel to the first electronic DC-AC power converter (19), so that the electric machine (8) can be controlled selectively only by the first electronic DC-AC power converter (19) or only by the second electronic DC-AC power converter (20) during operation thereof; and a control unit (21), which establishes which one of the two electronic DC-AC power converters (19, 20) has to control the same electric machine (8) and, therefore, establishes when to switch the electronic DC-AC power converter (19, 20) controlling the same electric machine (8);

the control method comprises the steps of:

always controlling the electric machine (8) with only one single electronic DC-AC power converter (19, 20) at a time, namely, in any situation, only one single electronic DC-AC power converter (19, 20) at a time applies an alternating voltage to terminals of the electric machine (8) and, therefore, supplies/absorbs an alternating current flowing through the terminals of the electric machine (8);

estimating an electric power to be supplied/absorbed to/by the electric machine (8);

establishing which one of the two electronic power converters (19, 20) has to control alone the same electric machine (8) based on the electric power to be supplied/absorbed to/by the electric machine (8);

controlling the electric machine (8) only with the second electronic DC-AC power converter (20) when the electric DC-AC power to be supplied/absorbed to/by the electric machine (8) exceeds a threshold value; and controlling the electric machine (8) only with the first electronic DC-AC power converter (19) when the electric DC-AC power to be supplied/absorbed to/by the electric machine (8) is below said threshold value.

* * * * *